(12) United States Patent
Harhurin et al.

(10) Patent No.: US 11,030,901 B2
(45) Date of Patent: Jun. 8, 2021

(54) METHOD AND DEVICE FOR PROVIDING TRAFFIC INFORMATION

(71) Applicant: Bayerische Motoren Werke Aktiengesellschaft, Munich (DE)

(72) Inventors: Alexander Harhurin, Munich (DE); Reinhard Jurk, Groebenzell (DE); Rene Molle, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/646,737

(22) PCT Filed: Sep. 27, 2018

(86) PCT No.: PCT/EP2018/076286
§ 371 (c)(1),
(2) Date: Mar. 12, 2020

(87) PCT Pub. No.: WO2019/072577
PCT Pub. Date: Apr. 18, 2019

(65) Prior Publication Data
US 2020/0279480 A1 Sep. 3, 2020

(30) Foreign Application Priority Data
Oct. 11, 2017 (DE) .................... 10 2017 218 097.8

(51) Int. Cl.
*G08G 1/09* (2006.01)
*G08G 1/0967* (2006.01)

(52) U.S. Cl.
CPC . *G08G 1/096741* (2013.01); *G08G 1/096775* (2013.01); *G08G 1/096783* (2013.01)

(58) Field of Classification Search
CPC ....... G08G 1/096741; G08G 1/096775; G08G 1/096783; G08G 1/096716; H04W 4/44
See application file for complete search history.

(56) References Cited

U.S. PATENT DOCUMENTS 6,442,394 B1 * 8/2002 Valentine ............... G08G 1/202
340/905
6,690,292 B1 * 2/2004 Meadows ............ G08G 1/0104
340/905
(Continued)

FOREIGN PATENT DOCUMENTS

DE 101 10 549 A1 9/2002
EP 1 037 187 A2 9/2000
(Continued)

OTHER PUBLICATIONS

International Search Report (PCT/ISA/210) issued in PCT Application No. PCT/EP2018/076286 dated Dec. 19, 2018 with English translation (four (4) pages).
(Continued)

*Primary Examiner* — Munear T Akki
(74) *Attorney, Agent, or Firm* — Crowell & Moring LLP

(57) ABSTRACT

A method for providing traffic information for a traffic participant, in particular for a road user such as a vehicle includes determining an information region for the traffic participant, providing traffic information for the information region of the traffic participant from one or more communications partners associated with the information region. In addition, the method includes sending reference information relating to the one or more communications partners to the traffic participant which the traffic participant may use to obtain traffic information from the one or more communication partners associated with the information region.

6 Claims, 2 Drawing Sheets

(56) References Cited

U.S. PATENT DOCUMENTS

| | | | |
|---|---|---|---|
| 2007/0124063 A1* | 5/2007 | Kindo | G08G 1/09675 |
| | | | 701/517 |
| 2010/0020169 A1* | 1/2010 | Jang | G08G 1/0962 |
| | | | 348/115 |
| 2010/0188265 A1* | 7/2010 | Hill | G08G 1/091 |
| | | | 340/905 |
| 2011/0095908 A1* | 4/2011 | Nadeem | B60H 3/00 |
| | | | 340/905 |
| 2011/0248867 A1* | 10/2011 | Lee | G08G 1/0104 |
| | | | 340/905 |
| 2012/0244795 A1 | 9/2012 | Heerdink et al. | |
| 2015/0371537 A1 | 12/2015 | Eilertsen | |
| 2017/0098373 A1 | 4/2017 | Filley et al. | |

FOREIGN PATENT DOCUMENTS

| | | |
|---|---|---|
| NL | 1007930 C1 | 2/1998 |
| WO | WO 2008/154476 A1 | 12/2008 |
| WO | WO 2017/107169 A1 | 6/2017 |

OTHER PUBLICATIONS

German-language Written Opinion (PCT/ISA/237) issued in PCT Application No. PCT/EP2018/076286 dated Dec. 19, 2018 (six (6) pages).

German-language Search Report issued in German Application No. DE 102017218097.8 dated Mar. 14, 2018 with partial English translation (12 pages).

German-language Office Action issued in German Application No. DE 102017218097.8 dated Jul. 25, 2018 (five (5) pages).

* cited by examiner

METHOD AND DEVICE FOR PROVIDING TRAFFIC INFORMATION

CROSS REFERENCE TO RELATED APPLICATIONS

This application is a National Phase Application of PCT International Application No. PCT/EP2018/076286, filed Sep. 27, 2018, which claims priority under 35 U.S.C. § 119 from German Patent Application No. 10 2017 218 097.8, filed Oct. 11, 2017, the entire disclosures of which are herein expressly incorporated by reference.

BACKGROUND AND SUMMARY OF THE INVENTION

The invention relates to a device, in particular a backend server, and to a corresponding method for providing traffic information.

A road user, in particular a vehicle, can communicate with a central unit, for example with a backend server, via a wireless communication connection in order to obtain traffic information relating to the current environment of the road user in real time. In this case, the bandwidth of the wireless communication connection and/or the transmission capacity of a central unit are typically limited.

Particularly in the case of frequently changing traffic information or changing information which is needed to control a vehicle in road traffic, the volume of data to be transmitted from a central unit to a vehicle may be relatively high. The present document deals with the technical object of providing a device and a method which can be used to provide frequently changing (traffic) information for a road user, in particular for a vehicle, in a reliable and resource-efficient manner.

The object is achieved by means of the independent claims. Advantageous embodiments are described, inter alia, in the dependent claims. It is pointed out that additional features of a patent claim dependent on an independent patent claim, without the features of the independent patent claim or only in combination with a subset of the features of the independent patent claim, can form a separate invention which is independent of the combination of all features of the independent patent claim and can be made the subject matter of an independent claim, a divisional application or a subsequent application. This applies, in the same manner, to technical teachings which are described in the description and can form an invention which is independent of the features of the independent patent claims.

One aspect describes a method for providing traffic information for a road user, for example for a vehicle, in particular for a road motor vehicle, for instance for an automobile, a bus, a truck and/or a motorcycle. In this case, the traffic information can comprise general information which is relevant and/or necessary for a road user in road traffic. In particular, the traffic information can comprise general information which is relevant and/or necessary for controlling a vehicle in road traffic. The method can be carried out by a central unit or by a backend server. The traffic information provided may comprise or indicate, for example, one or more traffic events in a particular region. Exemplary traffic events are: roadworks, an accident, a traffic jam, a roadblock, a local hazardous situation, etc. Alternatively or additionally, the traffic information provided may comprise information, in particular status information, relating to an infrastructure unit (for example traffic lights and/or a digital display panel). The information relating to an infrastructure unit may indicate, for example, the switching times of traffic lights and/or the speed limit displayed on a display panel. A traffic event and/or an infrastructure unit is/are typically associated with a particular position or with the particular regional section.

The method comprises determining an information region for the road user. In this case, the information region indicates that spatial region of a road network for which traffic information is intended to be provided.

The method also comprises transmitting reference information relating to a communication partner to the road user, wherein the communication partner is configured to provide traffic information relating to the information region. The reference information can be transmitted, for example, from the central unit to the road user. On the other hand, the actual traffic information can be at least partially provided by a communication partner separate from the central unit. A transmission of reference information relating to at least one communication partner, on the one hand, and a (separate) transmission of traffic information (that is to say useful data) from the communication partner, on the other hand, can therefore take place. The data traffic in a traffic information system can therefore be optimized, in particular reduced. Furthermore, the respectively used communication protocols for communication for transmitting the reference information and for transmitting the traffic information can thus be individually adapted. The data transmission reliability and efficiency can therefore be improved further.

The reference information can indicate how the road user can contact the communication partner. In particular, the reference information can indicate a communication address, for example an IP address, of the communication partner. Furthermore, the reference information can indicate a communication protocol to be used for communication with the communication partner. It can therefore be ensured that a road user can reliably contact a communication partner for providing traffic information.

If necessary, a plurality of different communication partners can be provided for an information region via the reference information. The road user can then contact the communication partners individually (in a point-to-point connection in each case) and/or selectively (for example only if required) in order to determine traffic information. The data traffic in a traffic information system can therefore be optimized further.

Traffic information can therefore be transmitted from at least one communication partner to a road user in a direct or immediate manner. The traffic information provided by a communication partner can be referred to as direct or immediate traffic information. The one or more communication partners relevant to an information region can be transmitted to the road user as reference information. In particular, the method may comprise determining one or more communication partners for the information region. In this case, the one or more communication partners may be arranged within the information region. Reference information relating to the one or more determined communication partners can then be transmitted. It can therefore be ensured that a road user can be informed as comprehensively as possible about the traffic situation in an information region. In this case, the traffic information which is provided by the different communication partners may be different.

The method may comprise providing a grid network having a multiplicity of grid cells. In this case, a grid cell can correspond to a regional section of the environment of the road user and/or of a road network. In other words, the environment of the road user and/or a road network can be subdivided into a multiplicity of different grid cells. The individual grid cells may have a standard size and/or shape (for example a rectangular shape).

A grid cell can indicate zero, one or more traffic events in the regional section corresponding to the grid cell. The traffic events may be determined on the basis of messages from road users and/or on the basis of data from one or more infrastructure units and may be stored in the respective relevant grid cells of the grid network. It is therefore possible to provide a grid network which indicates different traffic events in different regional sections. The traffic events in a grid network can be provided as (centrally conveyed) traffic information. The grid network, in particular the traffic events in a grid network, can be determined and updated by a central unit, for example. The centrally conveyed traffic information relating to the zero, one or more traffic events can possibly be transmitted directly from the central unit to a road user.

Alternatively or additionally, a grid cell can indicate zero, one or more communication partners for providing (direct or immediate) traffic information in the regional section corresponding to the grid cell. In this case, the zero, one or more communication partners may be arranged within the respective grid cell. The grid network can therefore indicate different communication partners for providing (direct or immediate) traffic information in different regional sections.

The transmission of reference information may comprise determining which one or more grid cells are included in the information region. Reference information relating to the zero, one or more communication partners in the one or more grid cells included in the information region can then be transmitted. The road user can therefore be reliably informed of all communication partners relevant to an information region in order to provide traffic information which is as comprehensive as possible.

As already stated above, the reference information can be transmitted from a central unit to the road user. The road user can then contact the one or more communication partners indicated in the reference information in order to obtain (direct or immediate) traffic information for the information region from the one or more communication partners.

Furthermore, the method can comprise transmitting centrally conveyed traffic information for the information region directly from the central unit to the road user. In particular, centrally conveyed traffic information relating to the one or more traffic events in the one or more grid cells of the information region can be transmitted directly from the central unit to the road user.

Sometimes direct or immediate traffic information and sometimes centrally conveyed traffic information can therefore be provided. In this case, the division can be effected in such a manner that the data traffic in the traffic information system is optimized, in particular reduced. For example, traffic information which must be updated relatively frequently can be advantageously provided as direct or immediate traffic information (and therefore in a decentralized manner). On the other hand, traffic information which needs to be updated relatively rarely can be advantageously provided as centrally conveyed traffic information (and therefore in a central manner). The (direct or immediate) traffic information provided by the communication partner may thus be such that the direct or immediate traffic information is updated more frequently on average than the centrally conveyed traffic information. The data traffic in a traffic information system can therefore be optimized further.

Traffic events (such as traffic jams, accidents, roadworks, etc.) typically change relatively rarely. On the other hand, the status of an infrastructure unit of a road network (for instance traffic lights or a display panel) can change relatively frequently. For example, the switching times of traffic lights and/or the information displayed on a display panel can change regularly. It can therefore be advantageous to provide information relating to an infrastructure unit of a road network in a direct or immediate or decentralized manner in order to reduce the data traffic in a traffic information system (and in particular the data traffic from a central unit).

The communication partner (which is indicated in the reference information) can therefore comprise or be an infrastructure unit within the information region. Furthermore, the (direct or immediate) traffic information provided by the communication partner can comprise information relating to the infrastructure unit. In particular, information relating to a status of the infrastructure unit can be provided.

The method typically comprises determining position information relating to a current position of the road user, in particular the vehicle. The information region can then be determined on the basis of the position information. In particular, an information region comprising the current position of the road user can be determined. If appropriate, a direction of movement of the road user may be taken into account. It is then possible to determine an information region which extends from the current position of the road user in the direction of the direction of movement of the road user. The relevance of the information transmitted to a road user can therefore be increased further in a reliable and resource-efficient manner.

The method may comprise determining a road type on which the road user is situated. For example, the road type can be determined on the basis of the position information in conjunction with digital map information. Exemplary road types are a freeway, a highway or road in a town. The information region can then also be determined on the basis of the road type. For example, a tubular information region along a freeway can be determined if the vehicle is on a freeway. The relevance of the information transmitted to a road user can therefore be increased further in a reliable and resource-efficient manner.

The method can comprise determining density information relating to a density and/or a quantity of traffic events in an environment of the road user. The density information may indicate a quantity and/or a number of traffic events per (regional) area or per regional section. Alternatively or additionally, the density information can indicate a volume of data which is to be transmitted for a traffic event. Alternatively or additionally, the density information can indicate a volume of data which is to be transmitted for the traffic information per area or per regional section. The quantity and/or number of traffic events can fluctuate regionally in this case and may be different in different regional sections.

The information region for the road user can then (possibly also) be determined on the basis of the density information. In this case, the size and/or the shape of the information region can be determined, in particular, on the basis of the density information. For example, an information region can be efficiently described by a polygon.

A relatively small information region can preferably be determined if the density information indicates a relatively high density and/or quantity of traffic events in the direct environment of the road user. On the other hand, a relatively large information region can be determined if the density information indicates a relatively low density and/or quantity of traffic events in the direct environment of the road user. The data traffic in a traffic information system can therefore be optimized further.

A further aspect describes a device, in particular a central unit or a backend server, for providing traffic information for a road user, in particular for a vehicle. The device is configured to determine an information region for the road user, wherein traffic information is intended to be provided for the information region. The device is also configured to transmit reference information relating to at least one communication partner to the road user, wherein the communication partner is configured to provide traffic information relating to the information region. In this case, the reference information can indicate how the road user can contact the communication partner.

A further aspect describes a software (SW) program. The SW program can be configured to be executed on a processor and to thereby carry out the method described in this document.

A further aspect describes a storage medium. The storage medium may comprise a SW program which is configured to be executed on a processor and to thereby carry out the method described in this document.

It should be noted that the methods, devices and systems described in this document can be used both alone and in combination with other methods, devices and systems described in this document. Furthermore, any aspects of the methods, devices and systems described in this document can be combined with one another in various ways. In particular, the features of the claims can be combined with one another in various ways.

The invention is described in more detail below on the basis of exemplary embodiments. In this case,

DETAILED DESCRIPTION OF THE DRAWINGS

Figure 1:
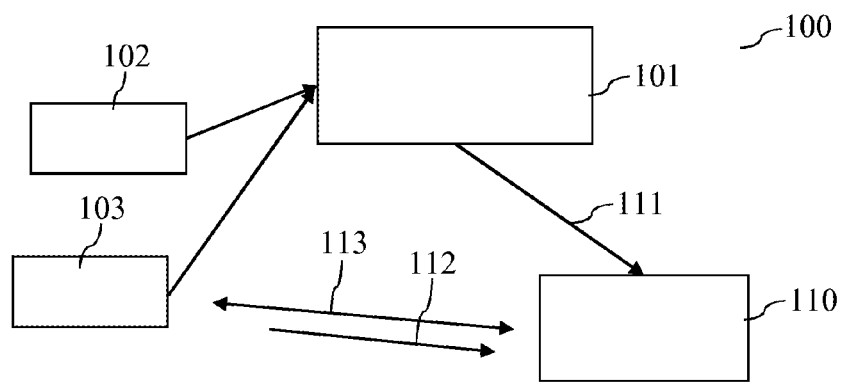
FIG. 1 shows an system for providing traffic information in accordance with an embodiment of the present invention.

As stated at the outset, the present document deals with the reliable and resource-efficient provision of traffic information for a road user, in particular for a vehicle. In this context, FIG. 1 shows an embodiment of a system 100 for providing traffic information (also referred to as a traffic information system 100). The system 100 comprises a central unit 101 (for example a backend server) which is configured to obtain traffic information from a multiplicity of information sources 102, 103. Example information sources 102, 103 are road users 102 (for instance vehicles, pedestrians, cyclists, etc.) and infrastructure units 103 (for instance cameras on bridges, traffic lights, display panels, etc.).

Figure 2:
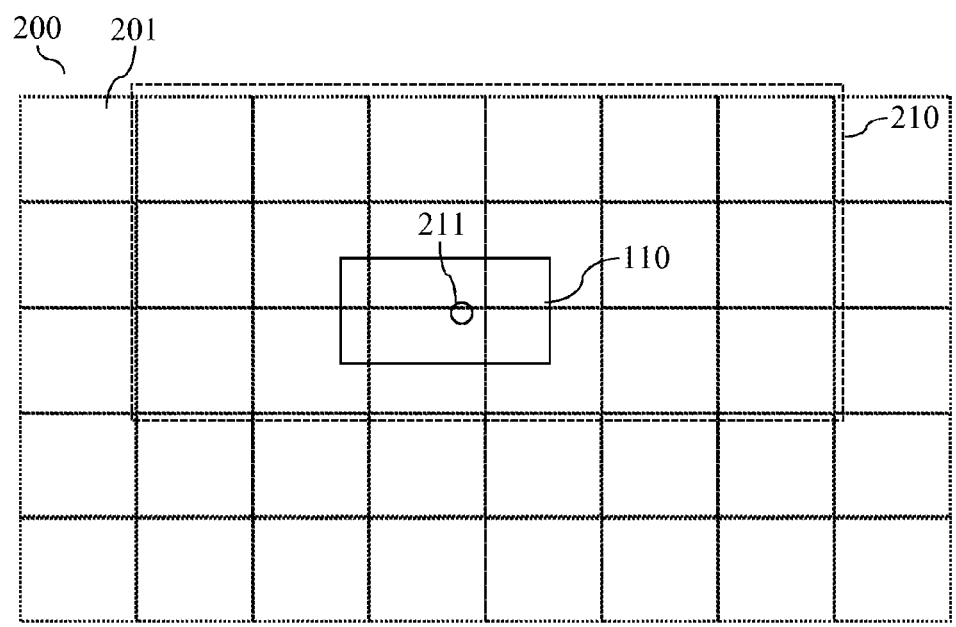
FIG. 2 shows an information region around the current position of a vehicle in accordance with an embodiment of the present invention.

The central unit 101 is configured to analyze the provided traffic information or the provided traffic events and to store it/them on the basis of a position (for example in a grid network 200 illustrated in FIG. 2). Example traffic information and example traffic events are: a blocked road or a blocked lane; an accident; a traffic jam; an object on a road; black ice or fog; the switching times of traffic lights; the information displayed on a display panel, etc.

A vehicle 110 (as an example road user) can register with the central unit 101. In this case, the current position of the vehicle 110 can be indicated. The central unit 101 can then provide the vehicle 110 with traffic information 111 from a particular region or from a particular environment around the current position of the vehicle 110 (via a wireless communication connection). The vehicle 110 can use the provided traffic information 111 in the course of one or more driver assistance functions. For example, routing of the vehicle 110 can be carried out on the basis of the traffic information 111 provided. Alternatively or additionally, a warning can be output to a driver of the vehicle 110 on the basis of the traffic information 111.

A vehicle 110 can therefore register with a backend server 101 in a position-based manner for a particular geo-region (for example in a particular map tile) in order to obtain traffic information 111 (for example a local risk warning) from this geo-region in real time. The position of the vehicle 110 can be captured using a navigation satellite system. A navigation satellite system here comprises any common and future Global Navigation Satellite System (GNSS) for position determination and navigation by receiving the signals from navigation satellites and/or pseudolites. For example, the Global Positioning System (GPS), the GLObal NAvigation Satellite System (GLONASS), the Galileo positioning system and/or the BeiDou navigation satellite system may be involved here. For example, the vehicle 110 may comprise a GPS module (not shown) which is configured to determine current GPS position data relating to the vehicle. On the basis of the determined GPS position data (position information), the vehicle 110 can therefore register with the backend server 101 in a GPS-based manner for a particular geo-region (for example a particular map tile) in order to obtain traffic information 111 from this geo-region in real time.

The traffic information 111 can be broadcast to the vehicle 110. The size of the geo-region can be permanently defined or stipulated in this case.

FIG. 2 shows an example subdivision of an environment of a vehicle 110 into a grid network 200 having a multiplicity of grid cells 201. The grid cells 201 may have the shape of squares in this case (as illustrated in FIG. 2). However, other shapes of grid cells 201 are also conceivable (for example a honeycomb shape). The central unit 101 can be configured to determine traffic information and to assign it to the different grid cells 201 of the grid network 200 on the basis of the position. A grid cell 201 can therefore be associated with zero, one or more traffic events. In this case, the position of the grid cell 201 corresponds to the position of a traffic event which is associated with the grid cell 201.

FIG. 2 shows a vehicle 110 which is arranged at a particular position 211 within the grid network 200. The vehicle 110 can transmit position information relating to the current position 211 of the vehicle 110 to the central unit 101. In response, the central unit 101 can determine an information region 210 from which the vehicle 110 is provided with traffic information 111. The information region 210 can be determined on the basis of the position information relating to the current position 211 of the vehicle 110. Furthermore, the information region 210 can be determined on the basis of a volume of traffic information 111 to be transmitted. The volume of the traffic information 111 to be transmitted can be determined in this case on the basis of the grid network 200. For example, the information region 210 can be gradually extended by one or more grid cells 201 until a particular limit data volume of traffic information 111 to be transmitted has been reached. This can result in the determination of a relatively large information region 210 if the grid cells 201 in the environment of the vehicle 110 are associated with relatively few traffic events. On the other hand, this can result in the determination of a relatively small information region 210 if the grid cells 201 in the environment of the vehicle 110 are associated with a relatively large number of traffic events.

The central unit 101 can therefore transmit traffic information 111 relating to a particular information region 210 (via a wireless communication connection) to a road user 110. In this case, the communication effort can be optimized by means of so-called publish/subscribe methods, as are provided by transmission protocols such as MQTT (Message Queue Telemetry Transport), for example. This makes it possible to transmit traffic information 111 in a situation-based manner, for example in the case of a new event within a geographical information region 210. For this purpose, a road user 110 subscribes to a geographical information region 210 and/or a grid cell 201 (which is identified by an identification number, for example) and then receives the traffic information 111 for this area. The traffic information 111 provided or transmitted by a central unit 101 can be referred to as centrally conveyed traffic information 111.

In order to transmit comparatively slowly variable information, for example geometrical properties of the road network or the presence of current dangers (deer crossing, persons on the road, etc.), the approach described above is well suited to providing traffic information 111. However, for applications, for example the transmission of traffic light switching times, in which the information 111 to be transmitted changes relatively quickly, the approach mentioned above results in relatively large volumes of data and therefore in a relatively large amount of communication effort between a road user 110 and a central unit 101. This is the case, in particular, when an information region 210 or a grid cell 201 has a relatively large number of units 103 with relatively quickly variable information. For example, a grid cell 201 having a typical tile size of 2 km×2 km in a city center may contain approximately 50 traffic lights each with variable switching times, which can result in relatively large volumes of information 111 to be transmitted.

In order to reduce the data volume, the actual traffic information may at least sometimes not be transmitted using the subscription mechanism described, but rather alternatively it is possible to transmit a reference to where the actual information can be retrieved. This reference information is typically considerably less variable over time, with the result that the communication effort for communication between the central unit 101 and a road user 110 can be reduced. The road user 110 subscribes to an information region 201 and/or a grid cell 201. This road user 110 then receives, as information 111, information relating to the communication end points of the one or more traffic infrastructure units 103 (for example traffic lights) from the central unit 101. The road user 110 can then establish a direct communication connection 113 to the communication end point of a traffic infrastructure unit 103. An optimized protocol of a relatively low communication layer in the OSI model, for example TCP or UDP, can be used for communication between the communication end point of an infrastructure unit 103 and a road user. In this case, the road user 110 can possibly contact only the infrastructure units 103, from which specific traffic information 112 is required. The traffic information 112 provided by an infrastructure unit 103 can be referred to as direct or immediate traffic information 112.

Figure 3:
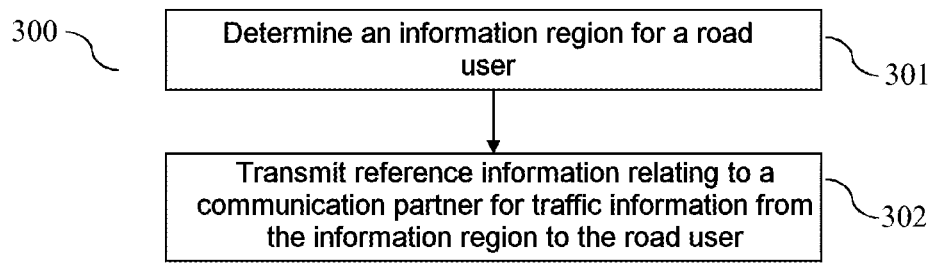
FIG. 3 shows a flowchart of an method for providing traffic information in accordance with an embodiment of the present invention.

FIG. 3 shows a flowchart of an example method 300 for providing traffic information 111, 112 for a road user 110, in particular for a vehicle 110. The traffic information 111, 112 can indicate one or more traffic events in an environment of the vehicle 110. Example traffic events are: speed limits, traffic jams, accidents, roadworks, local weather information (black ice, fog, etc.), etc. Furthermore, the traffic information 111, 112 can comprise status information relating to one or more infrastructure units 103 in the environment of the vehicle 110. Example status information is the switching times of traffic lights and/or the information displayed on a display panel. The method 300 can be carried out by a central unit 101, in particular by a backend server.

The method 300 comprises determining 301 an information region 210 for the road user 110. In this case, the current position 211 of the road user 110 can be taken into account when determining the information region 210. The current position 211 can be received as position information at a central unit 101. It is therefore possible to determine an information region 210 for which traffic information 111, 112 is intended to be provided.

The method 300 also comprises transmitting 302 reference information relating to a communication partner 103 (in particular relating to an infrastructure unit) to the road user 110, wherein the communication partner 103 is configured to provide traffic information 112 relating to the information region 210. The traffic information 112 provided by a communication partner 103 can be referred to as direct or immediate traffic information 112 since this traffic information 112 is not provided by the central unit 101 centrally (and typically indirectly), but rather directly by the communication partner 103. The reference information can indicate how the road user 110 can contact the communication partner 103 in order to obtain the (direct or immediate) traffic information 112. In a preferred example, a communication partner 103 for providing traffic information 112 corresponds to an infrastructure unit of a road network (for example traffic lights or a digital display panel). Furthermore, in a preferred example, the traffic information 112 provided by a communication partner 103 corresponds to status information relating to a status of an infrastructure unit.

In addition, the method 300 can comprise transmitting centrally conveyed traffic information 111 directly from the central unit 101 to the road user 110. Centrally conveyed traffic information 111 can be provided, for example, for traffic events which change relatively rarely. On the other hand, frequently changing traffic information 112 (in particular traffic information 112 relating to an infrastructure unit) can be provided directly or immediately by transmitting reference information with respect to a communication partner 103.

The separate transmission of communication parameters to a traffic infrastructure unit 103 (for example traffic lights) and useful data relating to the infrastructure unit 103 (for example the switching time of traffic lights) can reduce the communication effort in a traffic information system 100 (in particular for the central unit 101 of the system 100). The communication connection for transmitting useful data then takes place directly between a road user 110 and an infrastructure unit 103 without the involvement of the central unit 101. The respectively used communication protocol can be optimized in this case, possibly on the basis of the respective infrastructure unit 103. In the case of traffic lights, only relatively short fragments of information can be transmitted in a bandwidth-optimized manner, for example. The security requirements can likewise be optimized separately in the two transmission operations (for reference information, on the one hand, and for traffic information 112, on the other hand). As a result of the absence of a central component on the application layer in the central unit 101, the described separate transmission of reference information and useful information is readily scalable to a relatively large number of road users 110.

The present invention is not restricted to the example embodiments shown. In particular, it should be noted that the description and the figures are merely intended to illustrate the principle of the proposed methods, devices and systems.

What is claimed is:

1. A method for providing traffic information for a road user; comprising the acts of:
   determining an information region for the road user;
   transmitting reference information relating to one or more communication partners to the road user, the reference information including information useable by the road user to contact the one or more communication partners and the one or more communication partners including an infrastructure unit of a road network in the information region;
   providing traffic information from the one or more communication partners relating to the information region to the road user;
   determining the one or more communication partners for the information region; and
   transmitting traffic information for the information region directly from a central unit to the road user,
   wherein
   the traffic information provided by the communication of the one or more communications partners associated with the infrastructure unit includes information relating to the infrastructure unit, and
   the traffic information provided by the one or more communication partners is updated more frequently on average than the traffic information from the central unit.

2. The method according to claim 1, wherein the reference information includes
   a communication address of at least one of the one or more communication partners,
   a communication protocol to be used for communication with at least one of the one or more communication partners, or
   the communication address or the communication protocol of the at least one of the one or more communication partners.

3. The method according to claim 1, wherein the act of determining the information region of the road user includes
   determining position information relating to a current position of the road user,
   determining information relating to a road type on which the road user is situated, or
   determining the position information relating to the current position and the road type information of the road user.

4. The method according to claim 1, wherein the act of determining the information region of the road user includes providing a grid network having a plurality of grid cells corresponding to regional sections of an environment of the road user (110), and
   each of the plurality of grid cells indicates zero, one, or more communication partners for providing traffic information in the regional section corresponding to the respective grid cells.

5. The method according to claim 4, wherein act of transmitting reference information includes
   determining which one or more of the plurality of grid cells are in the information region, and
   transmitting reference information relating to the zero, one or more communication partners in the one or more of the plurality of grid cells determined to be in the information region.

6. A device for providing traffic information a road user, wherein the device is configured to
   determine an information region for the road user, and
   transmit reference information relating to one or more communication partners to the road user, the reference information including information useable by the road user to contact the one or more communication partners to obtain traffic information from the one or more communication partners relating to the information region to the road user and the one or more communication partners including an infrastructure unit of a road network in the information region,
   determine the one or more communication partners for the information region; and
   transmit traffic information for the information region directly from a central unit to the road user,
   wherein
   the traffic information provided by the communication of the one or more communications partners associated with the infrastructure unit includes information relating to the infrastructure unit, and
   the traffic information provided by the one or more communication partners is updated more frequently on average than the traffic information from the central unit.

* * * * *